June 28, 1955 C. E. McCLELLAN 2,712,061

MEANS FOR HIGH SPEED KEYING AT LOW RADIO FREQUENCY

Filed Nov. 3, 1948 2 Sheets-Sheet 1

WITNESSES:
E. A. McBlakey.
Wm. L. Groome

INVENTOR
Cyril E. McClellan.
BY
Hyman Diamond
ATTORNEY

MEANS FOR HIGH SPEED KEYING AT LOW RADIO FREQUENCY

Filed Nov. 3, 1948 2 Sheets-Sheet 2

WITNESSES:

E. A. McCloskey

Wm. C. Groome

INVENTOR

Cyril E. McClellan.

BY

Hyman Diamond.

ATTORNEY

United States Patent Office 2,712,061

Patented June 28, 1955

2,712,061

MEANS FOR HIGH SPEED KEYING AT LOW RADIO FREQUENCY

Cyril E. McClellan, Glen Burnie, Md., assignor to Westinghouse Electric Corporation, East Pittsburgh, Pa., a corporation of Pennsylvania Application November 3, 1948, Serial No. 58,064

6 Claims. (Cl. 250—8)

This invention relates generally to improved methods and apparatus of communication and more particularly to methods and apparatus for decreasing distortion in frequency modulation systems of radio communication and for increasing the permissible speed of frequency shift keying in radio telegraph communication systems.

When a signal which is driving a resonant circuit is suddenly shifted in frequency the current in the resonant circuit does not follow the change in frequency with complete fidelity, and the distortion of the circuit response with respect to the impressed signal increases with increasing Q of the circuit and with decreasing signal frequency.

When the circulating currents are comparatively large, as occurs in high Q circuits, and in low radio-frequency high-power equipments, the actual time required for new equilibrium conditions to be established is so great as to constitute a severe distortion of the frequency modulated signals. In telegraph systems utilizing frequency shift keying, in particular, this distortion has the effect of prohibiting transmission of intelligence except at very low keying rates. If frequency modulation generally, or frequency shift keying in particular, is attempted in a transmitter utilizing several stages of amplification, each including a tuned circuit, the condition is further aggravated by each additional stage. The above effects may be more easily understood by the following reasoning: If the frequency of the driving signal be suddenly changed the circulating current in the driven circuit may be thought to consist of two components—i. e., the signal at the original frequency, which is decaying exponentially from the moment of frequency change from one value of frequency to another and a signal at the new frequency, which builds up exponentially from that same instant.

In a low Q or high frequency circuit the actual time required for the new frequency to acquire complete predominance will be negligible compared to the modulation rate, or to the duration of a dot or space signal in frequency shift keyed telegraphy. However, in a high Q or low frequency circuit the time required for new equilibrium conditions to be established may be so long as to approach the modulation rate or the time of a dot or space signal, requiring decrease of the modulation rate or of the keying rate in order to avoid undue distortion of the transmitted signals.

It has been found that the difficulty explained above may be overcome if, at the same time that the driving frequency is varied, the tuning of the resonant driven circuit is modified by a corresponding amount, so that the circuit after frequency variation of the driving signal is tuned to the new frequency. In such event the frequency of the next cycle of the circuit response occurring after a frequency variation corresponds in frequency precisely with the new driving frequency, as if the circuit had been running at that frequency continuously. It will be evident, then, that the only limitation on modulation or keying rate will be that the rate must be small compared with the transmitting frequency, and that transient effects occurring during and in response to frequency change will be of negligible duration.

Various methods of accomplishing the change of tuning of a driven circuit in synchronism with a change of frequency of a driving signal may be utilized in particular applications of my invention.

In accordance with one specific example of my invention, I may vary the capacity of a variable condenser associated with the resonant driven circuit in response to the modulating signal. The condenser itself may be built with one fixed and one movable plate, the latter being moved electro-mechanically by means of an actuating coil to which may be supplied the modulating signal. Devices of this character may be constructed to operate at frequencies of many hundreds of cycles per second and even thousands of cycles per second.

In low power equipment, electronic devices such as reactance tubes may be utilized in circuit with the resonant load to shift the tuning thereof. Reactance tube circuits, however, ordinarily utilize hard tubes, which have considerable losses and which operate at low efficiency, and such circuits are therefore not advantageous in high power transmitters.

It is desirable, in transmitting circuits, that any currents which are to be diverted from a load for the purpose of changing the tuning of circuits, pass through low resistance circuits in order to avoid undue power losses. Additionally, for high power circuits wherein large currents must be handled, the use of hard tubes is impracticable, tubes having the requisite current capacity being either unavailable or extremely expensive.

Nevertheless the use of electronic means for varying the tuning of the driven circuit is highly desirable, since such means are extremely rapid in operation and are virtually trouble free. I have, accordingly, devised a circuit which finds particular application in frequency shift communication systems for modifying the frequency of a resonant load circuit by discrete increments in correspondence with corresponding changes in the frequency of the signal impressed thereon, and which employs thyratrons or other types of gaseous conduction tubes. Such tubes have extremely low internal resistance and, accordingly, introduce but slight losses into the circuits with which they are operated, are capable of handling extremely large currents, and may be keyed simply and with extreme rapidity.

Since thyratron controlled frequency shifting circuits may be adjusted to provide frequency shifts by finite increments only, such circuits are not utilizable to advantage in systems which are required to handle continuously frequency modulated signals, for example, in certain types of facsimile systems, in radio telephone systems, and in systems for the general transmission of intelligence by frequency modulation of a relatively low frequency carrier. The utilization of thyratron keyed systems for shifting the frequency of a resonant load circuit, is, however, of particular advantage in facsimile systems for the transmission of half-tone material, and the like, by means of frequency shift keyed transmitters, enabling rapid transmission of material on low frequency carriers.

For the transmission by radio of general intelligence in terms of frequency modulation of a low frequency carrier, variation of the natural frequency of the antenna circuit of the system in synchronism with the frequency excursions of the carrier may be accomplished by controlling the impedance of a bi-lateral circuit element which is coupled or connected with the antenna circuit. The bilateral circuit element may comprise a saturable reactor, the reactance of which may be a function of the amplitude of a modulating signal. Alternatively, I may utilize capacitors of special character, which have the property of varying in capacitance in accordance with the magnitude of a voltage impressed thereacross.

Briefly described, and as applied to frequency shift telegraphy or facsimile systems, the present invention provides a source of radio frequency energy which may be frequency shift keyed, that is, shifted in frequency in discrete steps in one sense with respect to a mean frequency, to represent telegraphic dots or facsimile markings, and in the opposite sense to represent dashes or spaces. The required frequency modulation may be produced in any one of a number of well known ways, in accordance with known practices in the pertinent art, the specific method utilized forming, however, no part of my invention. The frequency shifted oscillator may comprise a relatively low power oscillator, the output of which may be amplified to a value suitable for transmission; alternatively, a high power oscillator may be employed, the output of which may be directly radiated.

Because of their unusual propagation characteristics, radio frequencies as low as 15 kc. are sometimes employed for communication. These low frequencies have the property of being very stable in their performance, energy being transmitted as a strong ground wave which is but very slightly subject to daily or annual variations in transmission characteristics and to fading. Consequently, these frequencies can be depended on when all other communication fails, and are utilized when extremely dependable communication is desired, as, for example, in military applications.

The major disadvantages inherent in the use of extremely low frequencies for radio communications are the requirements that the keying speed or modulation rate be kept low, that high powers be used, and that an extensive antenna installation be utilized. This invention does not concern itself with the antenna problem, but only with the problem of increasing the possible keying speed or modulation rate, in low frequency high power systems.

The antenna and its tuned circuit may be considered a simple parallel resonant circuit, with the radiation resistance of the antenna providing a dissipative element.

The resonant frequency of the tuned circuit may be controlled, in accordance with a preferred embodiment of the invention, by coupling thereto an inductance, which may be short-circuited when it is desired to vary the normal resonant frequency of the tuned circuit, and which may otherwise remain open-circuited. When short-circuited the coupled inductance reflects into the resonant circuit a component of reactance which modifies the normal resonant frequency of the resonant circuit.

For the purpose of establishing and disestablishing a short circuit across the terminals of the coupled inductance, I prefer to employ a pair of gaseous conduction electronic devices, such as thyratrons, the plates of which are connected in push-pull relation to the voltage induced in the inductance, the cathodes being connected together, and to a center point of the inductance.

The control electrodes of the thyratrons may be electrically tied together, and the keying potential which is applied to the driving oscillator may likewise be applied to the control electrodes, to enable the thyratrons to fire for one keying condition and to be non-conductive for the other, by raising the potential applied to the control electrodes above the critical value for the first mentioned keying condition, and reducing the potential applied to the control electrodes below the critical value for the alternative keying condition.

Thyratrons are available which are capable of the extremely rapid firing and de-ionizing required for the present application, wherein each thyratron must fire and deionize in response to an alternating plate voltage applied thereto, not at the radio frequency rate of perhaps 15 kc. per second, but sufficiently early in the appropriate half cycles of radio frequency energy applied thereto, that the delay in firing or in de-ionizing is negligible in comparison with the time of a half cycle of the radio frequency energy. Thyratrons are available, moreover, which have the requisite power capacity to handle the loads imposed thereon, as well as the inverse voltage ratings required when the thyratrons are not fired.

It is, accordingly, a primary object of the present invention to provide a system for increasing keying speeds in frequency shift keyed telegraphy systems.

It is a broad object of the present invention to provide a system for conforming the frequency of response of a tuned circuit to the frequency of a driving signal, when the latter is varied in frequency.

It is a further object of the present invention to provide a system of high speed frequency shift keying in low frequency radio telegraphy systems.

It is another object of the present invention to provide a system for varying the resonant frequency of a tuned circuit by introducing therein reflected reactance to accomplish the variation.

It is a more specific object of the present invention to provide a novel system of frequency shift keyed radio communication wherein the resonant frequency of the antenna of a radio transmitter is shifted in correspondence with shifts of transmitted frequency, to maintain correspondence between the transmitted frequency and the resonant frequency at all times, thereby to reduce or substantially eliminate transient responses of the antenna to shifts of the transmitted frequency.

It is a still more specific object of the invention to provide a novel system of frequency shift keyed radio telegraphy wherein the resonant frequency of the antenna of a radio telegraph transmitter is shifted in correspondence with shifts of transmitted frequency, by reflecting into the antenna circuit a suitable reactance, reflection of the reactance into the antenna circuit occurring in response to firing of gaseous conduction electronic control devices enabled in response to keying signals.

It is a further broad object of the present invention to provide an improved system of transmission of general intelligence, involving signals representative of aural or pictorial matter, in terms of frequency modulation of a low frequency carrier.

The above and still further objects, features and advantages of the invention will become evident upon consideration of the following detailed description of an embodiment thereof, especially when taken in conjunction with the accompanying drawings, wherein.

Figure 4:
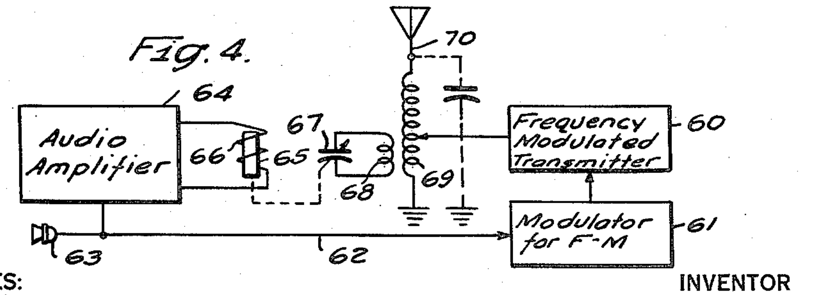
Figure 4 is a functional block diagram, partly schematic, illustrating a radio transmitter in accordance with the invention for transmitting a carrier which is frequency modulated in response to an audio signal.
Figure 8:
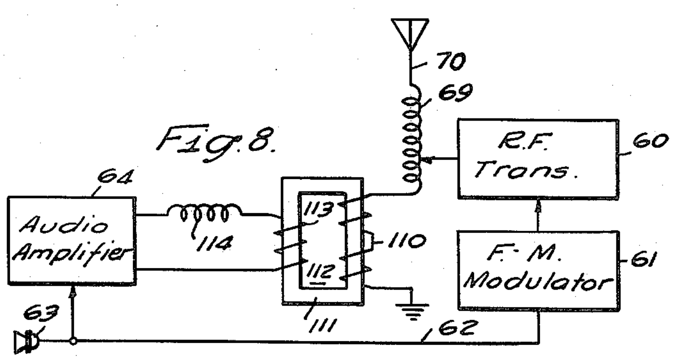
Figure 9:
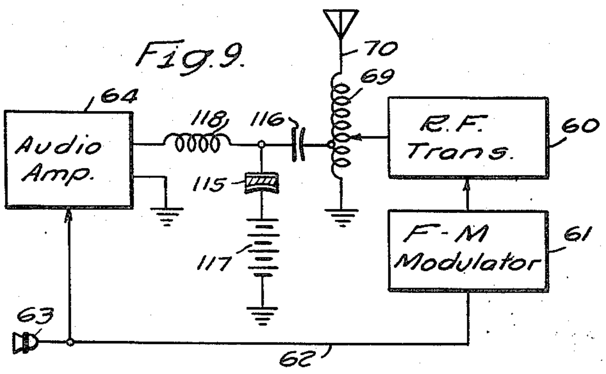

Figure 8 is a schematic diagram of a modification of the system illustrated in Figure 4 of the drawing, employing a saturable reactor for varying the natural frequency of a resonant driven load circuit, which takes, specifically, the form of a tuned antenna circuit; and Figure 9 is a schematic diagram of a modification of the system illustrated in Figure 8 of the drawings, wherein the saturable reactor is replaced by a condenser having capacitance variable with potential applied thereacross.

Figure 1:
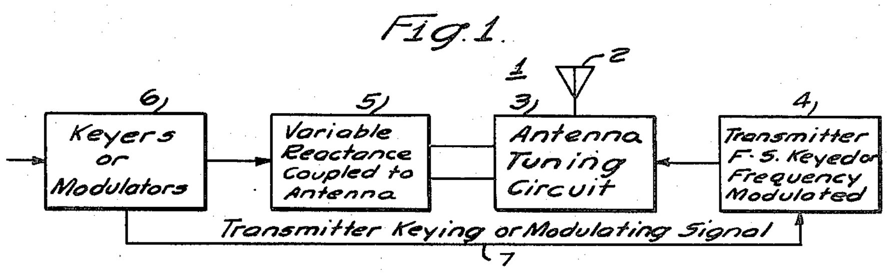
Figure 1 is a functional block diagram of a circuit arrangement illustrating the basic concept of the present invention.

Referring now particularly to Figure 1 of the drawings, there is illustrated an antenna system 1, comprising a radiating element 2 associated with an antenna tuning circuit 3, which determines the resonant frequency of the antena system 1. A transmitter 4 is provided, which is coupled with the antenna system via the antenna tuning circuit 3, and which provides a radio frequency carrier for radiation by the antenna system. The transmitter 4, for the puroposes of explaining the system of Figure 1, may be either frequency shift keyed or frequency modulated by an audio signal, or the like. The signals transmitted by the antenna system 1 being correspondingly frequency modulated, or frequency shift keyed. As has been explained hereinabove, if the antenna tuning circuit 3 has an extremely high Q, or low logarithmic decrement, the response of the antenna system, or the current flowing therein, will not follow precisely the frequency variations of the signals provided by the transmitter 4, since the antenna tuning circuit 3 will require time after a variation of the frequency of the carrier applied thereto to build up a signal at the new frequency, and since the signal subsisting in the tube circuit prior to the frequency variation will require a finite time to decay to a negligible value. If the transmitter 4 is modulated by an audio signal, the high Q antenna tuning circuit 3 will introduce distortion of the frequency modulation carrier supplied by the transmitter 4. If the transmitter 4, on the other hand, is a frequency shift keyed transmitter the distorted response which is present in the antenna tuning circuit 3 at each shift in frequency of the transmitter 4, may endure for an appreciable fraction of the duration of the keyed signals, and necessitate slowing of the keying rate.

In accordance with the present invention, I have associated with the antenna tuning circuit 3 a variable reactance 5 for introducing into the antenna tuning circuit 3 changes of reactance and accordingly changes of resonant frequency. The variable reactance 5 may be controlled in response to the keyer or modulator 6 which supplies keying or modulating signals via a lead 7 to the transmitter 4, and by proper choice of the circuit parameters of the variable reactance 5 in relation to the circuit parameters of the antenna tuning circuit 3 the antenna tuning circuit 3 may be maintained continuously in resonance with the frequency supplied by the transmitter 4. I have found, by utilizing this arrangement, that the transient responses otherwise present in the antenna tuning circuit 3 in response to frequency variation of the signal supplied thereto by the transmitter 4 may be substantially completely eliminated, enabling a great increase in frequency shift keying rate, or the transmission of higher audio frequencies without distortion than is otherwise possible.

Figure 6:
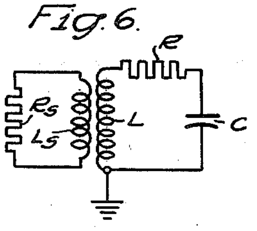
Figure 6 is a schematic diagram of a pair of coupled circuits, utilized to provide a basis for mathematical demonstration of principles employed in the practice of the invention.

Reference is now made to the circuit of Figure 6 of the drawings, in which L and C constitute a low radio frequency resonant circuit of resonant frequency $f$. Coupled to this circuit is a secondary inductance, $L_s$, the resistance of which, when shorted, is $R_s$, which is very much smaller than $\omega L_s$. The effect of the coupled secondary is to insert an impedance in series with L, the magnitude of which is given by $$Z=(\omega M)^2/XL_s=(\omega M)^2/j\omega L_s=-j\frac{(\omega M)^2}{\omega L_s}$$

where M is the mutual inductance and $\omega$ is the frequency in radians per second, or $2\pi f$. We have, then, for the resonance condition, where the reactances of the two arms, L and C, are equal in magnitude, and assuming $R<<L$ $$(1) \qquad \omega L-\omega^2M^2/\omega L_s=1/\omega C$$

$$(2) \qquad \omega^2=1/(L-M^2/L_s)C$$

and the new resonant frequency is given by $$f=1/2\pi[(L-M^2/L_s)C]^{1/2}$$

Accordingly, by proper choice of circuit constants, short circuiting of the secondary $L_s$ may be caused to effect a predetermined change in the resonant frequency of the primary circuit. Short circuiting of the secondary may be accomplished by means of mechanical contacts, or, preferably, by means of a pair of thyratrons or gaseous conduction electronic devices, as illustrated in the circuit diagrams of Figures 2 and 3 of the drawings, respectfully, to which reference is now made.

Figure 2:
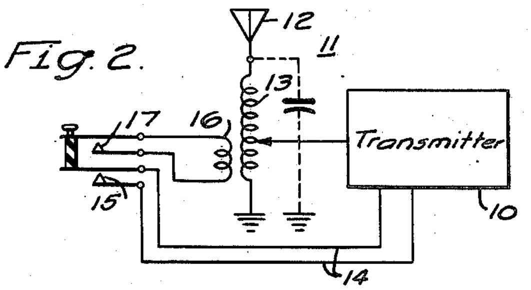
Figure 2 is a schematic circuit diagram of a frequency shift keyed transmitter having an antenna tuning arrangement in accordance with the invention, whereby the frequency of the antenna is modified in correspondence with the frequency shift of the transmitter.

In Figure 2 of the drawings, which illustrates a frequency shift keyed system comprising a transmitter 10, which energizes an antenna system 11 comprising a radiating element 12 and a loading coil 13 for tuning the antenna system 11, a frequency shift keying circuit 14 is provided in association with the transmitter 10, and varies the normal frequency of the transmitter 10 in response to closure of a pair of mechanical contacts 15. Inductively coupled with the loading coil is a secondary coil 16, which may be short circuited in response to closure of a pair of normally open contacts 17, the contacts 15, 17 associated with the secondary coil 16 and with the frequency shift keying circuit, respectively being ganged for simultaneous operation. The antenna circuit 11 is tuned to resonance with the output frequency of the transmitter 10, in its unkeyed condition, the inductance coil 16 coupled with the antenna loading coil 13 being then open circuited, and therefore without effect on the tuning of the antenna circuit 1. Closure of the frequency shift keying contacts 15 shifts the frequency of the transmitter, the simultaneous closure of the contacts 17 associated with the secondary tuning coil 16 short circuiting the latter and introducing reactance, by reflection, into the circuit of the loading coil 13.

For high power operation, however, the provision of contacts capable of short circuiting the secondary tuning coil 16, and handling the extremely large circulatory current flowing therein under short circuit conditions, is an extremely difficult one. Further, mechanical contacts have a tendency to arc when opened, which maintains a closed circuit across the tuning coil after opening of the contacts, and destroys the synchronism of keying intended to be established between the two sets of contacts 15 and 17. Accordingly, while a system of the type illustrated in Figure 2 is satisfactory for relatively low power operations, this is no longer true when large amounts of power must be handled.

Figure 3:
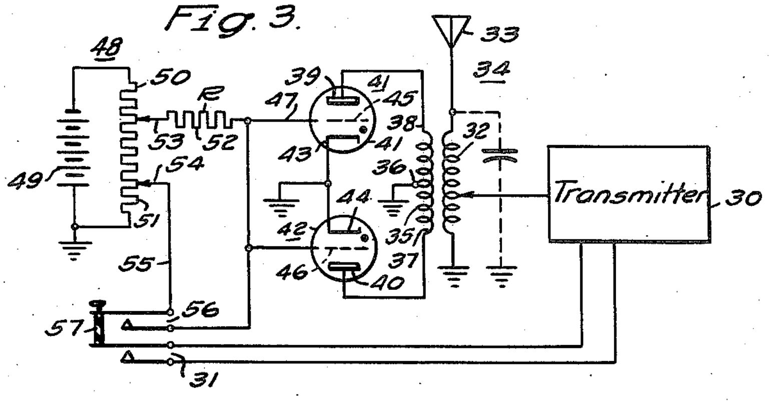
Figure 3 is a schematic circuit diagram of a modification of the system of Figure 2 wherein control of the resonant frequency of the antenna is accomplished electronically.

Reference is now made to Figure 3 of the drawings, wherein is illustrated a modification of the system illustrated in Figure 2 in which the short circuiting of the antenna tuning coil is accomplished by means of a pair of gaseous conduction electronic devices, specifically thyratrons, which are capable of providing extremely rapid circuit making and breaking, and which have large current carrying capacity, adequate for utilization in conjunction with transmitters operating at high power levels.

Briefly described, the system of Figure 3 utilizes a frequency shift keyed transmitter which energizes a high Q antenna circuit operating at relatively high power, and at low frequency. The frequency of the transmitter may be shifted in any manner known in the art, as, for example, by varying the control potential applied to a reactance tube modulator, associated with the oscillator of the transmitter or in response to closure of mechanical contacts which short circuit a portion of the oscillator tank circuit. Inductively coupled to a loading coil which provides primary tuning for the antenna circuit is a secondary tuning coil, connected in push-pull across a pair of gaseous conduction electronic control devices. Control devices of this character have the property of conducting electric currents across their anode to cathode circuits, while the anode is positive with respect to the cathode, provided the potential applied to a control electrode of the control device is more positive than a predetermined critical value characteristic of the device. So long as the potential applied to the control electrode is below the critical value, no conduction will take place, the control device being effectively blocked. Upon raising the potential applied to the control electrode above the critical value, however, current flows through the device upon application to the anode thereof of a positive potential, and thereafter the control device loses control of current flow, current continuing to flow regardless of the potential on the control electrode, until the potential on the anode of the device is reduced substantially to zero.

In the present system, a pair of contacts is ganged with the contacts which control the frequency of the transmitter, these contacts controlling the bias on each of the control electrodes of a pair of gaseous electronic control devices, specifically thyratrons, maintaining the latter open circuited for one frequency of transmission, and enabling firing of the control devices for an alternative frequency of transmission. Since the tuning coil, referred to hereinabove, is connected in push-pull across the control devices, one or another of the control devices will be maintained conductive, by virtue of the application of positive potential to the anode thereof, so long as the control potential is maintained above the critical value established for the control devices. The tuning coil is short circuited effectively by the firing of the control devices, and a reactance is introduced into the loading coil associated with the antenna, to vary the resonant frequency thereof.

By proper selection of inductance values in the tuning coil, and of the coefficient of coupling between the loading coil and the tuning coil, a suitable reactance may be introduced into the loading coil, when the tuning coil is short circuited, to tune the antenna circuit to the frequency provided by the transmitter in its frequency shifted condition.

Referring now more specifically to Figure 3 of the drawings, the reference numeral 30 represents a radio frequency transmitter, operating at low radio frequency and high power, and having a normal frequency $f1$ when contacts 31 are open, and a frequency $f2$ upon closure of the contacts 31. The manner of accomplishing a frequency shift at the transmitter 30 in response to closure of the contacts 31 is not specifically described or illustrated, since various means of accomplishing this objective are well known in the prior art. Specifically, the contacts 31 may be utilized to short circuit a portion of the resonant tank circuit of the transmitter, to short circuit a trimmer condenser associated with the tank circuit, to vary the bias on the control grid of a reactance tube modulator associated with the oscillator of the transmitter, or the like, the specific manner of accomplishing tuning of the transmitter 30 forming, per se, no part of the present invention. Transmitter 30 supplies radio frequency energy to a loading coil 32 connected in series with a radiating element 33 of an antenna system generally identified by the reference numeral 34, the loading coil 32 having an inherent shunt capacity to ground which, together with the inductance of the loading coil 32 determines the resonant frequency of the antenna system 34. The latter frequency may correspond with the frequency supplied by the transmitter 30 when the transmitter frequency-control contacts 31 are open. Upon closure of the contacts 31, the frequency of the transmitter 30 is shifted. The antenna circuit 34, however, being a high Q circuit, or otherwise expressed, a circuit having low logarithmic decrement, is unable to respond instantaneously to the new frequency and accordingly, for a period of time determined by the Q of the antenna circuit 34, transient currents exist, which represent distortion, and which are undesirable since they reduce the possible keying speed of the transmitter.

For the purpose of eliminating the transient responses the resonant frequency of the antenna circuit 34 may be shifted simultaneously with the shift in output frequency of the transmitter 30, to maintain identical tuning of the antenna circuit 34 and of the transmitter 30 at all times. I have found, in this mode of operation, that the antenna circuit 34 does not develop transient responses to the frequency shifts of the transmitter 30, and that the antenna circuit 34 proceeds to oscillate at the new frequency impressed thereon without substantial delay.

In order to accomplish variation of tuning of the antenna circuit 34 I have coupled to the loading coil 32 a tuning coil 35 the center point 36 of which is grounded and the end points 37, 38 of which are connected respectively in push-pull relation, respectively with the anodes 39, 40 of a pair of gaseous conduction electronic control devices, 41, 42, the cathodes 43 and 44 of which are grounded. The radio frequency currents flowing in the loading coil 32, accordingly, induce in the tuning coil 35 coupled therewith an alternating voltage at the frequency of the transmitter 30, the alternating voltage being applied in opposite phase or in push-pull, to the separate anodes 39, 40 of the electronic control devices 41 and 42, tending to cause the latter to conduct in alternation at the frequency of the transmitter. The electronic control devices 41 and 42 are provided with control electrodes 45 and 46, respectively, which are tied together electrically and which are connected via a lead 47 to a bias control arrangement, generally identified by the reference numeral 48. The bias control arrangement 48 comprises a source of potential, which is illustrated as a battery, to simplify the drawings, but which in commercial and practical embodiments of my invention may normally be expected to correspond with an electronic power supply of known and conventional character, and comprising one or more rectifiers and suitable filtering circuit. Across the potentional source 49 is connected a voltage divider 50, one end, 51, of which is grounded. The lead 47, which is connected with the grids 45, 46, of the control devices 41, 42, serves to connect the control grids 45, 46 via a resistance 52 and a positionable contact 53, to a point on the voltage divider 50 which has a potential sufficiently high to exceed the critical bias of the control devices 41 and 42. A further positionable contact 54 is provided for the voltage divider 50, which is connected over a lead 55 with one contact of a normally open pair of contacts 56, the remaining contact of which is connected directly with the lead 47. So long as the contacts 56 remain open the potential applied to the lead 47, and consequently to the control electrodes 45 and 46, corresponds with the potential at the contact 53 of the potentiometer 59. However, upon closure of the contacts 56 the lead 47 is connected directly with the contact 54 of the voltage divider 50, which now determines the potential of the lead 47 and consequently of the grids 45 and 46. The potential of the points 54 is selected to be below the critical potential required for permitting firing of the control devices 41 and 42. The resistance 52 prevents drawing of abnormal power from the source 49 when the contacts 56 are closed.

By proper proportioning of the inductance of the loading coil 32 and of the secondary tuning coil 35, as well as of the coefficient of coupling therebetween, the reactance introduced into the loading coil circuit by the tuning coil when in short circuited condition in response to firing of the control devices 41, 42 may be arranged to have a value precisely adapted to retune the antenna circuit 34 to the new frequency of the transmitter 30.

The separate pairs of contacts 31 and 56 are opened and closed together, by mechanically ganging the separate pairs of contacts, the ganging mechanism being illustrated conventionally by the insulating bar 57. The ganging means 57 may be operated in response to manually controlled keying (not illustrated), or to an automatic keying system (not illustrated) for the purpose of conveying intelligence by frequency shift keying the transmitter 30. While the contacts 31 remain open the transmitter 30 transmits on a frequency $f1$, to which the antenna system 34 is tuned, and the tuning coil 35 remains open circuited by virtue of the cut-off bias applied to the grids 45, 46 of the control devices 41, 42, which prevents firing of the latter. Upon closure of the contacts 31 the frequency of transmission of the transmitter 30 is shifted by a predetermined increment. Simultaneous closure of the contacts 56 results in a shift of bias potential on the grids 45, 46 of the control devices 41, 42 to a value above the critical value, and the control devices 41, 42 commence to fire in alternation at the frequency of the driving source comprising the transmitter 30. The coil 35 is short circuited by firing of control devices 41, 42 and introduces into the loading coil 32 a reactance which, by proper proportioning of the circuit parameters may be arranged to have precisely the correct value required to maintain synchronism between the tuning of the antenna circuit 34 and the transmitter 30.

Merely by way of example, and not by way of limitation, suitable values of frequencies $f1$ and $f2$ corresponding with the alternating frequencies of transmission of the transmitter 30 may correspond with values of the order of 15 kilocycles per second, as a mean value, the difference between the two frequencies $f1$ and $f2$ being of the order of 20 to 100 cycles per second. My invention finds primary, but not exclusive, application to circuits operating at these low frequencies, since it is in such circuits that duration of transient responses may approach the durations of keyed signals even for relatively low keying speeds. It is to be understood, however, that the present invention is not limited to any specific range of operating frequencies and frequency shifts, these being cited merely for the purpose of providing a specific example of a preferred mode of applying the invention, as required by the statutes relating to Letters Patent of the United States.

In accordance with still another embodiment of my invention the principles thereof may be applied to a frequency modulated transmitter designed and arranged for the purpose of transmitting audio or pictorial intelligence, that is, intelligence comprised in an audio or video frequency spectrum of substantial extent, as distinguished from frequency shifts of discrete amount.

In the system of Figure 4, to which reference is now made, a frequency modulated transmitter is modulated by an audio signal. The frequency modulated transmitter drives an antenna system having an extremely high Q, which, as has been explained hereinabove, introduces distortion in the radiated signal by virtue of the inability of the high Q circuit to respond to changes of frequency of the driving frequency applied thereto by the frequency modulated transmitter at the rate of variation of the latter. Otherwise expressed, the current flowing in the antenna circuit has an envelope which does not correspond with the envelope of the driving voltage.

In accordance with the principles of the present invention, there may be associated with the antenna circuit an antenna tuning circuit, which may be arranged to introduce into the antenna circuit, preferably by reflection, a component of reactance having a magnitude determined by the audio signal applied to modulate the frequency modulated transmitter, and which, by proper selection of circuit parameters serves to maintain the resonant frequency of the antenna circuit in synchronism with the driving signal frequency applied thereto. There is thus made possible the use of a high Q antenna circuit for transmission purpose which is capable of handling extremely rapid or extremely wide variations in transmitted frequency without distortion.

Referring now more specifically to Figure 4 of the drawings, there is illustrated a transmitter 60 which is capable of frequency modulation, and which has associated therewith a modulator 61 arranged and adapted for modulating the frequency of the transmitter 60 in correspondence with a complex wave. In accordance with the usual and conventional practice in the art, the modulator 61 may comprise a reactance tube modulator circuit, responsive to audio signals supplied over a lead 62 from a source of audio frequencies which may comprise, for example, a microphone 63. The source of audio frequency 63 may further drive an audio amplifier 64 which may provide output at relatively high power for driving an armature 65 which is magnetically associated with a solenoid 66 energized from the output of the audio amplifier 64. The armature 65 may be mechanically coupled with one plate of a condenser 67 which is connected in series with a coupling coil 68 inductively associated with a loading coil 69, which primarily determines the tuning of an antenna system 70, driven from the frequency modulated transmitter 60. The reactance of the series circuit 67, 68 as seen from the loading coil 69, is a function of the capacitive value inherent in the condenser 67, and, accordingly, varies in correspondence with the audio signal provided by the audio source 63, by virtue of the mechanical oscillations of the armature 65, which are transmitted to one plate of the condenser 67, for the purpose of varying the capacity thereof, and which correspond in instantaneous magnitudes with the instantaneous amplitudes of the audio signals. Accordingly, there is reflected into the loading coil 69 a reactance having instantaneous values determined by the instantaneous amplitudes of the audio signals provided by the audio source 63. By proper selection of the relative values of the inductances of the coils 68 and 69, the coefficient of coupling between the coils 68 and 69, and the capacity as well as the law of capacity variation with plate position of the condenser 67, the tuning of the loading coil 69 may be caused to follow the frequency variations of the frequency modulated transmitter 60, which in turn effects a complete correspondence between the frequencies of circulating currents established in the antenna circuit 70 and the driving voltages provided by the frequency modulated transmitter 60. Distortion of the transmitted radiated signal is thereby avoided or substantially reduced, and the quality of the transmissions considerably improved.

In each of the specific embodiments of my invention hereinbefore described, a frequency modulated or a frequency shifted transmitter has been utilized to drive an antenna as a load circuit. The principal of the present invention, however, is not limited to apparatus wherein the load circuit of a source of energy is constituted of an antenna circuit, but applies broadly regardless of the specific character of the load circuit. So, where a frequency modulated oscillator is used to drive an amplifier having a high Q tank circuit, the response of the tank circuit will not follow precisely the applied driving voltage, and transient undesired responses or distortions will be introduced. Accordingly, where an antenna circuit having a high Q, or low logarithmic decrement, is coupled to a frequency shifted or frequency modulated oscillator by means of a power amplifier having high Q tank circuit, the radiated signal will suffer greater distortion than in the apparatus heretofore considered, since the antenna circuit will be subjected not only to the frequency variations or frequency shifts introduced by the initial driving source, but also by the transient responses caused by the failure of the amplifier tank circuit to follow, without time delay, the signal impressed on the input of the amplifier. Accordingly, in radio transmission systems involving a frequency modulated oscillator which drives one or more power amplifiers, the latter in turn driving an antenna circuit, or an equivalent load, and wherein the various resonant circuits operate at high Q or at low frequency, or both, it is essential that the principles of the present invention be applied not only to the ultimate load circuit but also to the intermediate amplifiers, in order to avoid or minimize distortion of the radiated signals.

Figure 5:
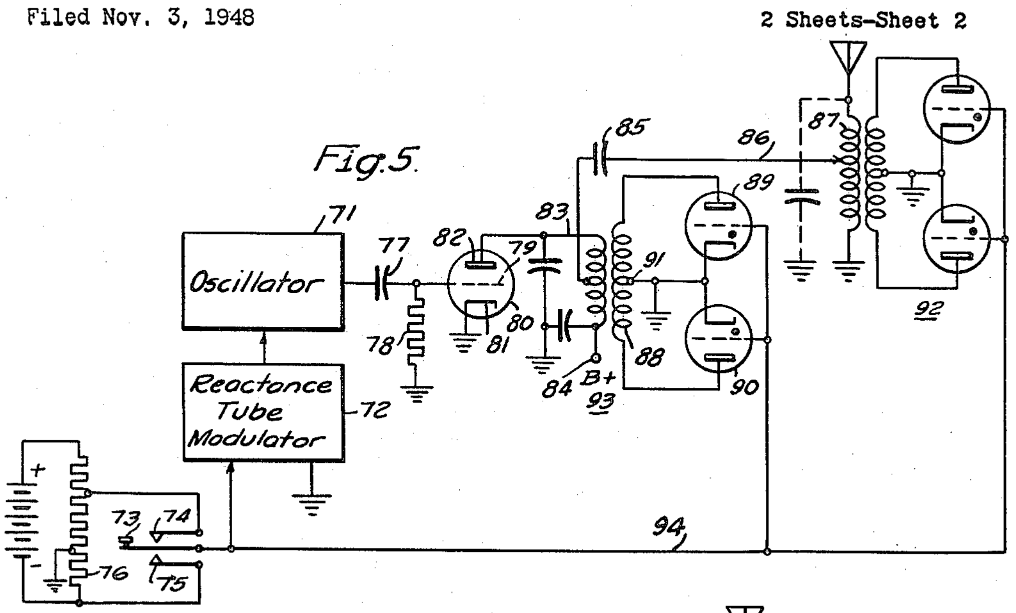
Figure 5 is a schematic circuit diagram of a modification of the system of Figure 3, employing a stage of power amplification.

Referring now more specifically to Figure 5 of the drawing, the reference numeral 71 identifies a low frequency highly stable oscillator, operating at a relatively low frequency, and providing relatively low power output. Associated with the oscillator 71 is a reactance tube modulator 72, for controlling the output frequency of the oscillator 1.

The output frequency of the oscillator 71 is determined by the reactance introduced into its resonant circuit by the reactance tube modulator 72, and that reactance is determined by the control potential applied to the reactance tube modulator 72, in a manner which is well understood in the art, and which accordingly requires no explanation herein. Control potentials are applied to the reactance tube modulator 72 by manipulation of the manual key 73, to bring the latter into contact with the contacts 74 and 75, selectively. When the key 73 is in contact with the contact 74 a positive control potential is applied to the reactance tube modulator 72, effecting transmission by the oscillator 71 of signals at a frequency $f1$. On the other hand, when the manual key 73 is in contact with the contact 75 a negative potential is applied to the reactance tube modulator 72, causing transmission from the oscillator 71 of signal at a different frequency, $f2$. The values of the frequencies $f1$ and $f2$ may be determined by suitable adjustment of the points of connection of the contacts 74 and 75 with the voltage divider 76. For low frequency output from the oscillator 71 which may, for example, be of the order of 15 kc. per second, as a mean value, the difference between the frequency $f1$ and $f2$ may be of the order of 20 to 100 cycles.

It is to be understood that the present invention is not limited to specific ranges of operating frequencies and frequency shifts stated above, these being cited merely for the sake of example. It will be further understood that while I have disclosed the invention as operating in conjunction with a manual key 73, that automatic operation is contemplated where high speed of communication is required, the key 73 then representing an automatic high speed keying mechanism or a facsimile scanner.

The output of the oscillator 71 may be applied over a coupling condenser 77 and a coupling resistor 78 to the grid 79 of a power amplifier triode 80, having a cathode 81 and a plate or anode 82. In series with the anode circuit of the triode 80 may be connected a resonant circuit 83, over which operating potential for the anode 82 of the triode 80 is applied from a source 84. The resonant circuit 83 may be highly stable or of high Q, and capable of handling large amounts of power, in practical embodiments of the system. The amplifier comprising the triode 80 and the resonant load circuit 83 constitutes, then, a means for amplifying the output of the oscillator 71 and creating corresponding output signal at high power, for application over a coupling condenser 85 and a line 86 to a resonant antenna circuit 87, which constitutes effectively a high Q parallel resonant circuit.

Upon shift of frequency output of the oscillator 71, in response to manipulation of the keying mechanism 73, from a frequency $f1$ to a frequency $f2$, the circulating currents in the high quality resonant circuits 83 and 87 tend to persist at the original frequency $f1$ and a signal at the new frequency $f2$ tends to build up at a relatively slow rate. The concurrence of the two signals in the oscillator tank circuit 83, and in the antenna circuit 87, introduces highly undesirable transient effects, which must be eliminated unless the duration of the transient effect is small relative to the duration of the dots and dashes constituting the communication. For high speed signalling, with highly stable tuned circuit, and for high power operation, the transient effects are, in fact, of undue duration in relation to desired keying rates, rendering communication impossible unless the keying rate is reduced or, in the alternative, the transient effects are eliminated.

As has been explained hereinabove, the transient effects may be substantially eliminated if the resonant frequency of the tank circuit 83, and of the antenna 87, are shifted when the frequency of the oscillator 71 is shifted, to maintain correspondence therewith at all times. This may be accomplished in accordance with the embodiment of my invention illustrated in Figure 5 of the drawings by coupling with the coil of the tank circuit 83 a secondary inductance 88 across which are connected in push-pull relation a pair of gaseous electronic control devices 89, 90, hereinafter referred to as thyratrons, the cathodes of which are tied together and connected to a grounded center tap 91 of the inductance 88. Accordingly, when the thyratrons 89 and 90 are conductive the secondary 88 sees the thyratrons 89 and 90 as a push-pull load of extremely low resistance. When, however, the thyratrons 89, 90 are non-conductive, the secondary 88 sees the thyratrons 89, 90 as an open circuit. For the purpose of controlling the conductive conditions of the thyratrons 89, 90 the grids of the thyratrons 89, 90 are tied together and connected with a line 94, connecting with the key 73.

There is likewise associated with the antenna tuning circuit 87, a similar assemblage of a coupling coil and a pair of push-pull connected thyratrons collectively identified by the reference numeral 92, and which essentially corresponds with the assemblage 93 utilized for controlling the resonant frequency of the tank circuit 83. Accordingly, the keying structure 73 which determines the oscillating frequency of the oscillator 71 likewise determines simultaneously the resonant frequency of the tank circuit 83 of the power amplifier comprising the triode 80 and the tank circuit 83 and the resonant frequency of the antenna circuit 87, driven by the power amplifier. By maintaining frequency synchronization between the oscillator 71, the tank circuit 83, and the antenna circuit 87, at all times, the possible keying rate of the system is increased, by virtue of the substantial elimination of transient responses.

Figure 7:
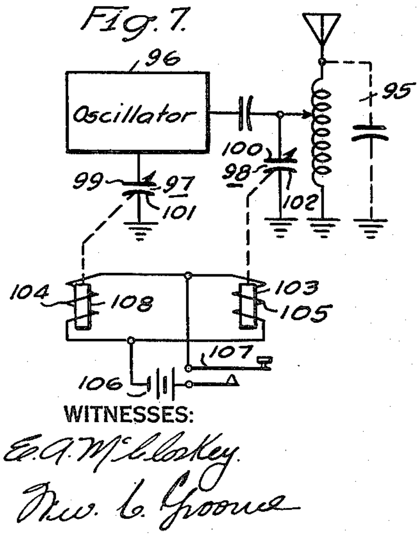
Figure 7 is a schematic circuit diagram of still a further embodiment of the invention, applied to frequency shift keyed transmitters.

In the various systems as hereinbefore described the frequency of a tuned load circuit has been varied by introducing extraneous reactance into the circuit by means of an external circuit inductively coupled thereto. It will be realized that a wide variety of expedients may be adopted for varying the tuning of a load circuit in synchronism with the output frequency of a driving source, the present invention being, in one aspect, broader than the specific circuits disclosed in the various illustrative embodiments of the invention. One possible system for synchronously varying the frequency of a driving oscillator and of a resonant low circuit involves the use of auxiliary tuning condensers for the oscillator, and for the load, the condensers being variable in respect to spacing in response to the manipulation of a manual key, or to circuit control effected by an automatic keying device. Reference is now made to Figure 7 of the drawings wherein is illustrated a specific embodiment of a system of this character.

In the system of Figure 7 a resonant antenna circuit having a high Q and identified by the reference numeral 95 is driven by an oscillator 96 in conventional fashion. Associated with the oscillator 96 is a frequency determining condenser 97, auxiliary to the main tuning condenser (not shown) of the oscillator 96. Connected in parallel with a portion of the resonant load circuit 95 is a further auxiliary tuning condenser 98. The condensers 97 and 98 are provided each with one immovable plate 99 and 100, respectively, and each with one movable plate 101 and 102, respectively, the movable plates 101 and 102 being grounded, and actuated in response to movement of armatures 108 and 103 which are driven by operating coils or solenoids 104 and 105 respectively.

Solenoids 104 and 105 are connected in parallel with a source of potential 106 connected in series with a manual key 107. When the key 107 is depressed the circuit to the potential source 106 is broken and the solenoids 104 and 105 are de-energized. When the solenoids 104 and 105 are de-energized the armatures 108 and 103 respectively assume a position of rest in response to which a predetermined spacing exists between the plates 99 and 101, and 100 and 102, respectively, the frequency of the oscillator 96 and of the tuned low circuit 95 being then identical. Upon releasing the manual key 107 the potential source 106 is connected to the solenoids 104 and 105 respectively in parallel energizing the latter and causing the associated armatures 108 and 103 to rise slightly, reducing the spacing between the plates 99 and 101, and between the plates 100 and 102, and increasing thereby the effective capacity of the condensers 97 and 98. The variation in capacity of the condenser 97 introduces a variation in frequency of the oscillator 96, and the variation in capacity of the condenser 98 introduces a similar variation in resonant frequency of the load circuit 95. Accordingly, as the key 107 is manipulated oscillator 96 varies in frequency of output in correspondence with a successive position of the manual key 107, the tuning of the load circuit 95 is varied in correspondence with the variation of the tuning of the oscillator 96, and accordingly synchronization of the frequencies of the oscillator 96 and the resonant circuit 95 is maintained, substantially to eliminate undesired transient effects in the load circuit 95.

Referring now more specifically to Figures 8 and 9 of the drawings, there are illustrated two modifications of the system of Figure 4 of the drawings, corresponding elements of the system of Figures 4, 8 and 9 being identified by the same numerals of reference.

The antenna loading coil 69, in Figure 8, is connected in series with a coil 110, which links with one leg of a saturable magnetic core 111 of a saturable reactor 112, having a further leg on which is wound a magnetizing winding 113. The magnetizing winding 113 is driven from the audio amplifier 64, and is provided in series connection, with a radio frequency choke 114, which serves to isolate the audio amplifier 64, as well as the magnetizing winding 113, from radio frequency currents flowing in the coil 110, and in the antenna circuit 69 and 70.

The impedance of the coil 110 is a function of the reluctance of the core 111, and hence of the degree of magnetic saturation of the core 111, which is, in turn proportional to the instantaneous values of audio signal applied to the magnetizing coil 13 by the audio amplifier 64.

By proper choice of electric and magnetic circuit constants the natural frequency of the antenna circuit 69, 70 may be maintained, in response to variations of the impedance of the coil 110 in series therewith, always identical with the driving frequency of the radio frequency transmitter 60, as the latter varies under control of the frequency modulator 61, in response to audio signals provided by the source 63.

It will, of course, be obvious that the source of signals, represented in the system illustrated in Figures 8 and 9 of the drawings as an audio source 63, may be in practical embodiments of my invention, a source of video signals, and specifically may comprise a facsimile scanner, a low definition television system, or the like.

It will further be clear that various modes of coupling the saturable reactor 112 with the loading coil 69 may be resorted to, without departing from the principle of the invention, and that various types of saturable reactors may be employed, the specific characters and modes of employment of which are well known in the art.

Referring now to Figure 9 of the drawings, the saturable reactor 112 is replaced by a capaciator 115, of special character, which is connected across a portion of the antenna loading coil 69, in series with a blocking condenser 116 and a source of bias potential 117.

The capacitor 115 is of known character, per se, possessing variable capacitance, the value of which is a function of the voltage impressed thereacross. The audio amplifier 64, operating at high voltage level, applies signal voltage across the capacitor 115, and thereby tunes the antenna circuit 70, in accordance with the audio signal impressed on the capacitor 115. The source of bias potential 117 serves to improve the linearity of capacity variation of capacitor 115 with impressed audio signal. The radio frequency choke 118 serves to isolate the audio amplifier 64 with respect to radio frequencies.

While I have described and illustrated various specific embodiments of my invention, in accordance with the requirements set out in the statutes relating to Letters Patent of the United States, it will be evident that various modifications of arrangement of the combinations described and illustrated may be resorted to, as well as variations of detail, without departing from the true spirit and scope of the invention.

I claim as my invention:

1. In a frequency-shift keyed telegraphy transmitter, in combination, a source of radio frequency signal operating at a first predetermined frequency, means for shifting the frequency of said signal intermittently in accordance with a time pattern adapted to convey intelligence, a resonant circuit coupled with said source of radio frequency signal in driven relation thereto and tuned normally to said first predetermined frequency, an inductive reactance coupled in inductive relation with said resonant circuit and normally open circuited, and means operated concurrently with said means for shifting the frequency of said signal for introducing a short circuit across said inductive reactance for reflecting into said resonant circuit a reactive impedance adapted to maintain frequency correspondence between the frequency of said signal and the resonant frequency of said circuit.

2. In a frequency-shift keyed telegraphy transmitter, in combination, a source of radio frequency signal operating at a first predetermined frequency, means for shifting the frequency of said signal intermittently to a second predetermined frequency, a resonant circuit coupled with said source of radio frequency signal in driven relation thereto and normally tuned to said first predetermined frequency, said resonant circuit having a low logarithmic decrement, a normally open reactive circuit coupled with said resonant circuit, and means for completing said reactive circuit in synchronism with said means for shifting the frequency of said signal intermittently comprising an electronic control device having an anode and a cathode connected across said reactive circuit means and a control electrode for determining the impedance of said electronic control device.

3. In a frequency-shift keyed telegraphy transmitter, in combination, a source of radio frequency oscillations operating at a first predetermined frequency, means for shifting the frequency of said radio frequency oscillations intermittently to a second predetermined rate, a resonant circuit coupled with said source of radio frequency signal in driven relation thereto and normally tuned to said first predetermined frequency, reactive circuit means electromagnetically coupled with said resonant circuit comprising an inductance, means normally preventing transfer of energy between said resonant circuit and said inductance, and means operating synchronously with said means for shifting the frequency of said radio frequency oscillations for enabling energy transfer between said resonant circuit and said inductance comprising a pair of gaseous electronic control tubes connected in push-pull relation across said inductance, bias responsive control electrodes for controlling firing of said control tubes, and means operated in synchronism with said means for shifting the frequency of said radio frequency oscillations for intermittently shifting the magnitude of control bias for said control electrodes for enabling and disabling firing of said pair of gaseous electronic control tubes.

4. In a frequency-shift keyed telegraphy transmitter, in combination, a source of radio frequency oscillations operating at a first predetermined frequency, means for shifting the frequency of said radio frequency oscillations intermittently to a second predetermined frequency at a first predetermined rate, a resonant circuit coupled with said source of radio frequency signal in driven relation thereto and normally tuned to said first predetermined frequency, reactive circuit means electromagnetically coupled with said resonant circuit, means normally preventing transfer of energy between said resonant circuit and said reactive circuit means, and means operating synchronously with said means for shifting the frequency of said radio frequency oscillations for enabling energy transfer between said resonant circuit and said reactive circuit means, said means for enabling energy transfer comprising a pair of electronic control tubes connected in push-pull relation across said reactive circuit means, and means for controlling the internal impedance of said electronic control tubes.

5. In a frequency-shift keyed system, a source of variable frequency radio frequency oscillations having a normal frequency of oscillation, means for varying the frequency of said source of radio frequency oscillations about said normal frequency in discrete increments in accordance to a time pattern adapted to convey intelligence, a resonant load circuit coupled in driven relation with said source of radio frequency oscillations and normally tuned to resonance with said normal frequency, inductive means coupled to said resonant load circuit, and means activated in synchronism with said means for varying the frequency of said source of radio frequency oscillations to short circuit said inductive means and introduce reactance by reflection into said resonant load circuit to maintain continuous frequency synchronism between said source and said load circuit.

6. In a frequency-shift keyed telegraphy transmitter, in combination, a source of radio frequency signal operating at a first predetermined frequency, means for shifting the frequency of said signal intermittently to a second predetermined frequency in accordance with a time pattern adapted to convey intelligence, a resonant circuit coupled with said source of radio frequency signals in driven relation thereto and tuned to said first predetermined frequency, and means operated concurrently with said means for shifting the frequency of said signal for inductively introducing into said resonant circuit a reactance having a value adapted to shift the resonant frequency of said resonant circuit to said predetermined frequency, said means for introducing reactance comprising an inductive reactance electromagnetically coupled with said resonant circuit and included in a normally open circuit, and means responsive to shifting of the frequency of said signals for closing said normally open circuit.

References Cited in the file of this patent

UNITED STATES PATENTS

| | | |
|---|---|---|
| 1,571,005 | Hartley | Jan. 26, 1926 |
| 1,578,551 | Schwartz | Mar. 30, 1926 |
| 1,649,131 | Schwartz | Nov. 15, 1927 |
| 1,684,235 | Love | Sept. 11, 1928 |
| 2,070,418 | Beverage | Feb. 9, 1937 |
| 2,176,868 | Boswau | Oct. 24, 1939 |
| 2,291,369 | Boughtwood | July 28, 1942 |
| 2,358,454 | Goldstine | Sept. 19, 1944 |
| 2,371,373 | Badmaieff | Mar. 13, 1945 |
| 2,395,928 | Willoughby | Mar. 5, 1946 |
| 2,480,820 | Hollingsworth | Aug. 30, 1949 |
| 2,489,064 | Vogel | Nov. 22, 1949 |